Feb. 28, 1967    J. A. GAYLORD    3,306,653
GROUND RELEASE FOR PARACHUTES
Filed Oct. 22, 1965    3 Sheets-Sheet 2
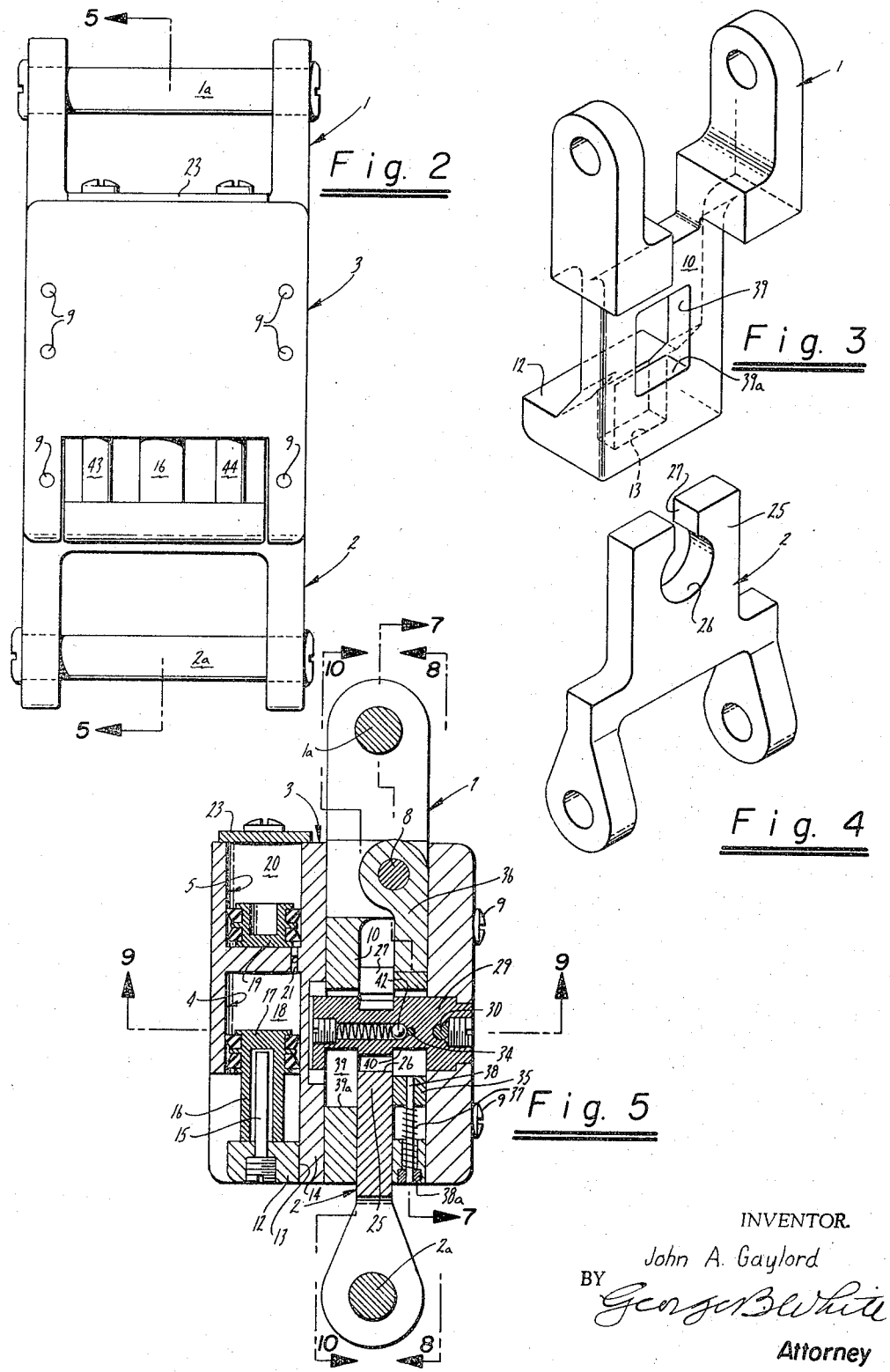
INVENTOR.
John A. Gaylord
BY George B. White
Attorney

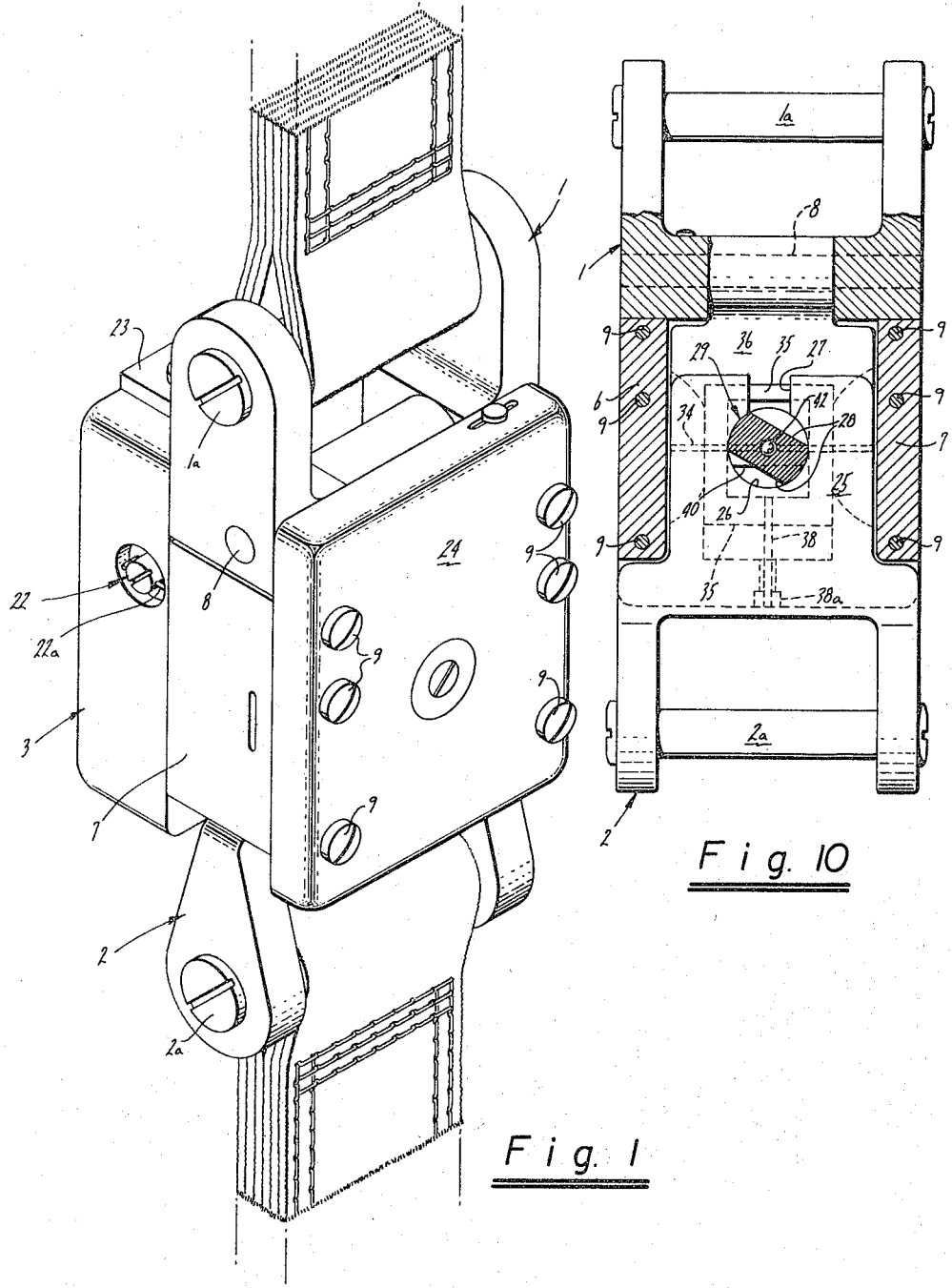

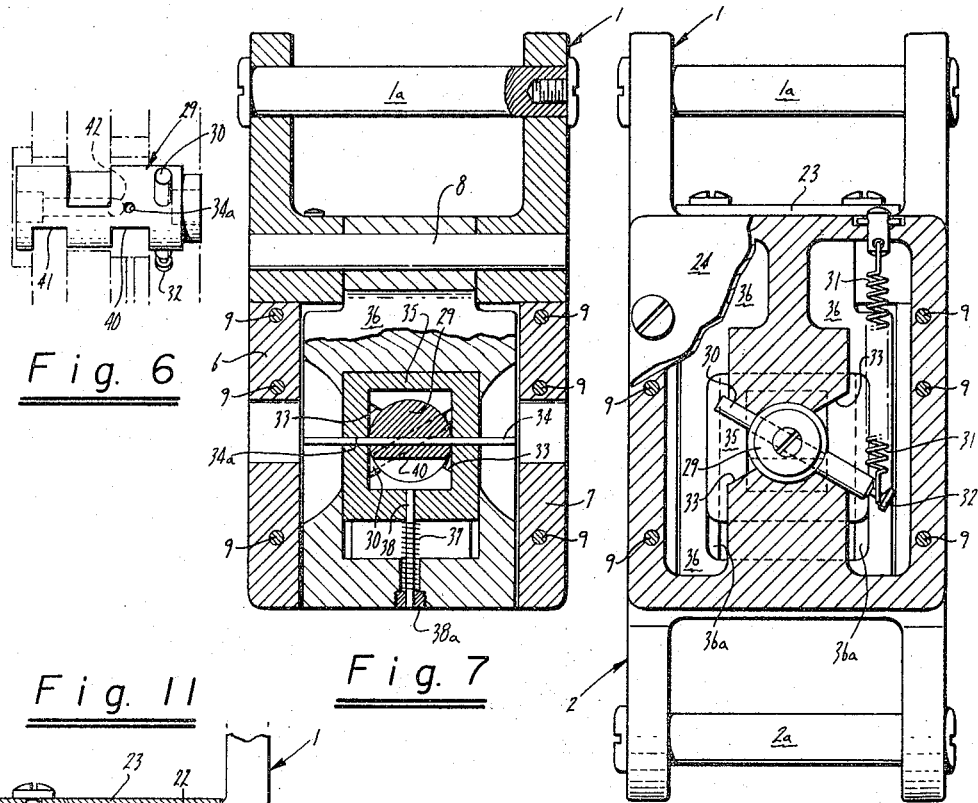
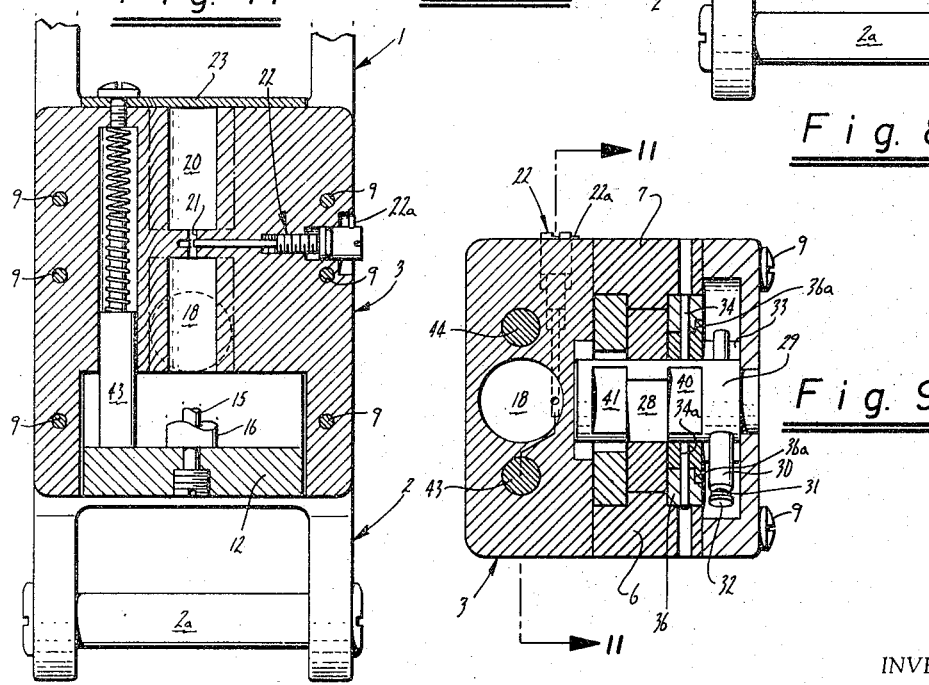

United States Patent Office 3,306,653
Patented Feb. 28, 1967

3,306,653
GROUND RELEASE FOR PARACHUTES
John A. Gaylord, San Rafael, Calif., assignor to H. Koch & Sons, Corte Madera, Calif., a corporation of California
Filed Oct. 22, 1965, Ser. No. 501,940
7 Claims. (Cl. 294—83)

My invention relates to a ground release mechanism or device for use with parachute borne loads.

When dropping material or equipment from high altitudes by means of a parachute it is necessary that the parachute be released from the load almost instantaneously when the load reaches the ground. Delay in effecting the release will cause the load to be dragged across the ground by the parachute with the resultant damage to the load or complete missing of the target or both. On the other hand, premature release of the parachute from the load while it is still in the air will result not only in damage, but possible complete destruction to the load.

It is therefore a primary objective of my invention to provide a device which would automatically release a parachute from its load when the latter reaches the ground.

Another object of my invention is to provide a device which would release a parachute from its load in a minimum of time after landing.

It is a further object of my invention to provide a device which would not prematurely release the parachute from its load before the latter reaches the ground.

It is still another object of my invention to provide a ground release device or mechanism which would be readily adaptable to different size loads and altitudes.

It is a still further object of my invention to provide a ground release which would be positive in action and more efficient and reliable than other means now in use.

These and other objects of my invention will become evident to those skilled in the art from a description which follows and from the drawings which form a part of this specification.

Reference should now be had to the drawings in which
FIG. 1 is a perspective view showing the general appearance and arrangement of the device of my invention.
FIG. 2 is a side view of my invention facing the housing.
FIG. 3 is a perspective of the top yoke or yoke number 1 of my invention.
FIG. 4 is a perspective of the bottom yoke or yoke number 2 of my invention.
FIG. 5 is a longitudinal section along the lines 5—5 of FIG. 2.
FIG. 6 is a longitudinal view of the rotating key 29.
FIG. 7 is a sectional view along the lines 7—7 of FIG. 5.
FIG. 8 is a partial longitudinal section along the lines 8—8 of FIG. 5.
FIG. 9 is a cross-section through my device along the lines 9—9 of FIG. 5 showing key 29 and crank 30.
FIG. 10 is a partial section along the line 10—10 of FIG. 2 showing bottom yoke 2 and flat section of key 29.
FIG. 11 is a section along the line 11—11 of FIG. 9 showing the relation of the spring pressed plungers 43 and 44 to the foot portion 12 of yoke number 1 and to the dashpot cylinder openings 18 and 20 and needle valve 22.

Referring now more particularly to FIGS. 1 through 5, there is seen an upper yoke 1 with its pin 1a hereinafter referred to as yoke number 1 which is fastened to the parachute in any approved manner. Lower yoke 2 with its pin 2a, hereinafter referred to as yoke number 2, is fastened to the load in any approved manner. The yokes are slideably positioned in a frame which consists of a housing 3 containing cushioning cylinders or dashpots 4 and 5, a pair of side members 6 and 7, and a cover plate 24 in spaced relation to the housing and held together by bolts 9. Yoke 1 has a plate stem section 10 which provides its means for sliding in a guide panel formed between the side plates 6 and 7. Yoke 1 is further characterized by a foot portion 12 at right angles to the plate stem 10 and contains a slot 13 in said foot parallel to the plate stem. The latter permits yoke 1 to slide over a flange section 14 in the housing member 3, as will become more evident below. In the foot 12 is screwed a pin 15 which extends into the stem 16 of the dashpot plunger 17 working in a cylindrical hole 18 in cylinder 4. The latter hole 18 is filled with grease.

In this illustration a silicone grease is used because the viscosity or fluidity of such grease remains substantially constant in a broad temperature range. For example, the so-called Dow Corning 33 grease has constant viscosity between minus one hundred degrees to plus three hundred and fifty degrees Fahrenheit.

A second dashpot plunger 19 is located in a cylindrical chamber 20 inside cylinder 5 and is axially aligned with dashpot plunger 17 in chamber 18. The two chambers are connected by a by-pass 21 which is controlled by a needle valve 22 equipped with a dial adjustment 22a for regulating the resistance to the flow of grease from the first chamber 18 into the second chamber 20. The second chamber 20 is covered by a plate 23 which is detachable for the purpose of resetting my device which is accomplished by pushing the second plunger 19 down and forcing the grease back into the first chamber 18.

Fixedly positioned on yoke number 1 is traveling block holder plate 36 fastened to yoke 1 by means of pin 8 which may best be seen by reference to FIGS. 5, 7, and 10. Slideably positioned within holder plate 36 is traveling block 35 which may move vertically in slots 36a. Passing axially through slider block 35 as well as through yoke number 1, yoke number 2, and cover plate 24, is rotating key 29, a longitudinal view of which may be seen at FIG. 6. Passing diametrically through rotating key 29 is shear pin hole 34 which is in alignment with corresponding holes through block 35 and holder plate 36 shown as 34a particularly in FIGS. 6, 7, and 9. Shear pin 34 is constrained against axial movement by spring held ball lock 42. Positioned against the bottom of block 35 is a spring 37 held on a pin 38 in the foot or lower portion 38a of the plate 36. This bears against the traveling block 35 to urge it towards rotating key 29 for a purpose which will become evident below. Rotating key 29 is equipped with flat sections 40 and 41, the purpose of which will likewise become evident below.

Extending diametrically through rotating key 29 is a crank 30 on one end of which 32 there is positioned a spring 31, the other end of said spring being fixedly positioned on the frame of cover plate 24. This entire end of rotating key 29 with the aforesaid crank and spring are all located in the hollow section inside of cover plate 24 which may be seen best on FIG. 8.

That portion of rotating key 29 which passes through yoke number 2 comprises a flattened section 28 which rotates in opening 26 in yoke number 2. Opening 26 communicates with a slot 27 through the upper part of yoke number 2 which may be seen best on FIG. 4. The upper plate section of yoke number 2 is seen at 25.

Two spring pressed plungers 43 and 44 are arranged to bear against the foot portion of number 1 yoke 12 and may be seen in FIGS. 2 and 11.

The relative positions and relationships of yokes 1 and 2, housing 3, cylinder 4, end plates 6 and 7, cover plate 24, traveling block 35, and traveling block holder 36, shear pin hole 34a, cover plate 24, and spring pressed plungers 43 and 44 may best be understood by reference to FIG. 9 which is a cross-section through this part of my device.

OPERATION

To ready my device for operating a sheer pin is first inserted into shear pin hole 34a. Chamber 18 is filled with a suitable grease as described above and dial 22a is adjusted to set the time of travel of plunger 17 and hence the timing of my device.

After the load is dropped, the opening shock of the parachute is transmitted from yoke 1 to yoke 2 through the intervening mechanism to plunger 17. The relative vertical movement between the yokes eventually causes traveling block 35 to shear the pin 34 and press against the flat spot 40 of rotating key 29 thus preventing its rotation. The pull from the parachute continues to be transmitted down through yoke 1, its foot member 12, and thence up through dashpot plunger 17 against the grease in chamber 18. The gradual flow of grease from chamber 18 into chamber 20 through orifice 21 permits yoke 1 to move slowly vertically with reference to yoke 2 and foot 12, and thus gradually applies a compression on spring pressed plungers 43 and 44. This insures that the load will be gradually applied to the springs and eliminates any vibration and shock to cause the release to operate prematurely. By the time plunger 17 nears the end of its stroke the bottom 39a in slot 39 located in the plate section 10 of toy yoke number 1 comes up to bear against the flat spot 41 on rotating key 29. This further insures against the rotation of rotating key 29 at this time.

When the load strikes the ground the compressive stress on the spring pressed plungers 43 and 44 created by the pull between the parachute and the load transmitted through the yokes is released. This permits the spring pressed plungers to travel downward forcing the foot 12 in yoke number 1 downward as well as bottom of 39a of slot 39, traveling block holder 36 and traveling block 35. Parts 39a and 35 thus lose contact with flat sections 41 and 40 of rotating key 29, permitting the latter to rotate by the action of spring 31 and crank 30 on key 29. Rotating key 29 then rotates until its flat sides 28 are in alignment with slot 27 in plate section 25 of yoke number 2. Abutments 33 located inside of cover plate 24 insure that this alignment is obtained. When thus aligned, of course, yoke 2 becomes disengaged from rotating key 29 and consequently from yoke 1 and immediate release of the parachute from its load is effected.

While I have shown a preferred embodiment of my invention I do not limit myself to the embodiment shown herein except as I do so in the claims which follow inasmuch as variations may be had upon my disclosure herein without departing from the basic principles of my invention which appear in the claims which follow.

I claim:
1. A ground release for a parachute borne load comprising:
   a first yoke adapted to be engaged by said parachute;
   a second yoke adapted to be engaged by said load;
   a housing engaging said first yoke and said second yoke in interlocking slideable relation with each other;
   a rotating key positioned in said housing and engaging axially aligned holes through said first yoke and said second yoke;
   a shear pin positioned axially through said key and engaging said first yoke;
      said shear pin being disposed to shear at a predetermined time;
   dashpot means interposed between said first yoke and second yoke whereby the rate of said relative outward motion between said yokes may be controlled;
   spring means interposed between said first yoke and said second yoke,
      said spring means being disposed to be compressed by said relative outward motion of said yokes;
      said spring means being further disposed to expand and cause relative inward motion of said yokes when said load reaches the ground;
   means for preventing rotation of said key until said yokes reach a predetermined relative position of inward motion;
   means for rotating said key;
   means cooperating with said key for unlocking said first yoke from said second yoke.

2. A ground release device for a parachute borne load comprising:
   a first yoke adapted to be engaged by said parachute;
   a second yoke adapted to be engaged by said load;
   a housing engaging said first yoke and said second yoke in slideable relation with each other;
   a rotating key engaging a hole in each of said yokes in axial alignment with each other;
   a shear pin engaging said key and said first yoke;
   a block positioned against said key and a spring means biased against said block to prevent rotation of said key;
   a radial crank positioned on said key and a spring means biased against said crank to produce rotation of said key;
   dashpot means interposed between said first yoke and said second yoke and disposed to control the rate of relative outward movement of said yokes;
   spring means positioned between said first yoke and said second yoke and disposed to compress upon relative outward movement of said yokes;
   means for releasing said key for rotation upon relative inward movement of said yokes;
   means for detaching said yokes from one another and said second yoke from said key upon a predetermined amount of rotation of said key.

3. A ground release device for a parachute borne load comprising:
   an upper yoke adapted to be engaged by said parachute;
   a lower yoke adapted to be engaged by said load;
   a housing engaging said upper yoke and said lower yoke in slideable relation with each other;
   a holder plate fixedly positioned on said upper yoke;
   a hollow traveling block positioned on said holder plate;
   a rotating key engaging axially aligned holes in said upper yoke, said lower yoke, and said traveling block;
   a shear pin engaging said rotating key and said traveling block;
   spring means biased to force said block against a flat spot in said key to prevent rotation of said key;
   a crank positioned radially on said key and a spring means biased against said crank to effect rotation of said key;
   a horizontal leg member forming a part of said upper yoke;
   dashpot means communicating with said leg member disposed to control the rate of upward travel of said member and said upper yoke;
   plunger mounted spring members communicating with said leg member disposed to compress upon upward movement of said upper yoke;
   a flat spot in said upper yoke disposed to engage a flat spot in said key when said upper yoke reaches a predetermined point in its upward travel;
   said spring members being further disposed to expand and force said leg member, said upper yoke and said traveling block downward and out of contact with said key permitting said key to rotate;
   means for detaching said lower yoke from said key when rotation of said key reaches a predetermined point.

4. The device of claim 3 in which said means for detaching said lower yoke from said key comprises:
   a flat section in said key comprising two parallel flat surfaces extending through the length of said key situated in said hole in said lower yoke;

a vertical slot extending from the upper end of said yoke through said hole in said lower yoke;

said slot being slightly greater in width than the thickness of said flat section;

a positive stop fixedly positioned with relation to said second yoke and said key and disposed to stop the rotation of said crank when said parallel flat surfaces of said flat section are in alignment with said vertical section.

5. A ground release device for a parachute borne load comprising:

a first vertical yoke adapted to be engaged by a parachute line;

a second vertical yoke adapted to be engaged by a load supporting line;

a rotating key member engaging said first yoke and said second yoke through horizontal holes in each of said yokes;

a first flat area on the outer surface of said key;

a spring loaded block slideably positioned on said first yoke and disposed to engage said first flat area of said key;

a shear pin disposed diametrically through said key and engaging opposite sides of said block;

a second flat area on the outer surface of said key;

a flat spot in said horizontal hole in said first yoke disposed to engage said second flat area of said key;

a horizontal leg member forming a part of said first yoke;

a vertical pin member positioned on said leg member;

a dashpot fixedly positioned with relation to said second yoke;

a plunger in said dashpot adapted to receive said vertical pin;

plunger mounted spring members positioned in fixed relation to said dashpot and said second yoke and adapted to engage said horizontal leg member;

a flat section in said key comprising two parallel flat surfaces diametrically opposite and equidistant from the center of said key, said flat section extending through the length of said key situated in said hole in said second yoke;

a vertical slot extending from the upper end of said second yoke through said hole in said second yoke;

said slot being slightly greater in width than the thickness of said flat section;

a spring actuated crank disposed diametrically across said key to effect rotation of said key;

a positive stop fixedly positioned with relation to said second yoke and said key and disposed to limit the rotation of said crank, said stops being so positioned that the rotation of said key is stopped when said flat surfaces of said flat section are in alignment with the sides of said vertical slot.

6. The device of claim 5 including in addition to the first dashpot of claim 5:

a second dashpot in axial alignment with said first dashpot;

connecting means communicating between the cylinder of said first dashpot and said second dashpot;

a needle valve interposed in said connecting means disposed to regulate the rate of flow of fluid between said first dashpot and said second dashpot;

a removable cover over the cylinder of said second dashpot;

whereby the upward motion of said first dashpot effected by the motion of said horizontal leg member is transmitted to said second dashpot and the downward motion of said second dashpot effected manually is transmitted to said first dashpot thereby resetting said plunger of said first dashpot.

7. The device of claim 5 including means for preventing axial movement of said shear pin comprising:

a screw member positioned axially in said key;

a spring engaging said screw member and a spherical ball;

said spherical ball engaging said shear pin in a radial direction.

References Cited by the Examiner

UNITED STATES PATENTS 2,504,125    4/1950    Hight _____ 294—83
3,249,328    5/1966    Knowles _____ 294—83

GERALD M. FORLENZA, Primary Examiner.

G. F. ABRAHAM, Assistant Examiner.